(12) United States Patent
Sprunk (10) Patent No.: US 6,253,223 B1
(45) Date of Patent: Jun. 26, 2001

(54) ROBUST RANDOM NUMBER GENERATOR

(75) Inventor: Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/455,951

(22) Filed: Dec. 7, 1999

Related U.S. Application Data (60) Provisional application No. 60/138,182, filed on Jun. 8, 1999.

(51) Int. Cl.[7] ........................................ G06F 1/02
(52) U.S. Cl. .............................. 708/250; 708/3
(58) Field of Search .................... 708/250–256, 708/3, 801

(56) References Cited

U.S. PATENT DOCUMENTS 5,627,775 * 5/1997 Hong et al. ................. 708/250
6,070,178 * 5/2000 Anderson et al. ........... 708/250
6,104,810 * 8/2000 DeBellis et al. ............. 708/250

FOREIGN PATENT DOCUMENTS

WO 97/05720  2/1997  (WO) .

* cited by examiner

*Primary Examiner*—David H. Malzahn
(74) *Attorney, Agent, or Firm*—Townsend and Townsend and Crew LLP (57) ABSTRACT

Methods and an apparatus for generating random numbers are disclosed. In a first embodiment, a method for generating random numbers involves producing a second random number. A pseudorandom number is produced from a digital random number generator and a first random number is produced from an analog random number generator. The first random number is combined with the pseudorandom number to produce a second random number that is a result of both generators' outputs

21 Claims, 6 Drawing Sheets

ROBUST RANDOM NUMBER GENERATOR

This application claims the benefit of U.S. Provisional Application No. 60/138,182 filed on Jun. 8, 1999.

BACKGROUND OF THE INVENTION

This invention relates in general to random number generators and more specifically to random number generators which use both digital and analog random number sources.

Random number generators are used for a variety of purposes such as cryptography. Correct use of cryptography depends on a statistically high quality source of random numbers. Unfortunately, conventional random number generators ("RNG") have disadvantages.

Simple random number generators use digital techniques to produce pseudorandom numbers. Pseudorandom numbers are substantially or highly random numbers which are produced by a digital process. Digital techniques can produce pseudorandom numbers which are deterministic because of their digital nature. In other words, two identical digital random number generators produce the same pseudorandom number when the digital input values are the same. Accordingly, digital techniques produce less than ideal results because the pseudorandom numbers are predictable.

A common digital technique for generating a random number is a linear congruential generator algorithm. This algorithm iterates to produce an output which is used as the seed for the next output. However, the sequence of random numbers produced by this technique is small and repeats after a relatively small number of distinct outputs. An orbit is defined herein as the number of outputs the digital random number generator produces until one output is the same as a previous output. As can be appreciated, a recursive algorithm will produce unique outputs in the orbit until an output is repeated. Once the first value repeats, the subsequent values will also be repeats. A repeating pattern is undesirable since it is predictable. This algorithm is found in most C programming language libraries.

To provide robust random numbers, conventional systems rely upon analog random number generators. Analog random number generators produce a stream of random numbers which do not have a periodic orbit like the digital random number generators. These analog random number generators typically convert a random analog voltage, such as noise, into a digital stream of random data. These circuits are typically separate integrated circuits which generate a stream of random numbers at a rate of 100 Kbits or less. However, these random number generation rates are inadequate for very high performance cryptography, where a large number of random bits is needed in a short period of time.

Analog random number generators are prone to failure. The lifetimes of analog random number generators are considerably less than the digital circuits which use the random numbers. As can be appreciated by those skilled in the art, failure of the analog random number generator can defeat effective cryptology. Additionally, the source of the analog voltage used to generate the random number is vulnerable to control by an attacker. Accordingly, there is a need for more reliable analog random number generators which are less vulnerable to attack.

Analog random number generators are typically located on a separate integrated circuit from the digital circuits which use the random numbers because digital semiconductor processes are generally incompatible with analog semiconductor processes. Digital integrated circuits typically have high gain and are optimized for fast CMOS switching. However, analog random number generators require linear analog characteristics to effectively amplify the source of the random voltage in order to randomly produce a digital data stream. Modifying the digital semiconductor process to create better analog characteristics is possible, but the digital circuit performance would be adversely affected. Accordingly, integrating an analog random number generator on the same integrated circuit is very difficult with conventional techniques.

Additionally, an analog random number generator located on an integrated circuit separate from the integrated circuit containing the digital cryptographic function is prone to attack. More specifically, the trace on the circuit board which carries the random number to the cryptographic function is vulnerable. For example, an attacker can manipulate or replace the signal from the analog random number generator. As those skilled in the art can appreciate, this attack would render the cryptographic algorithm and keys more easily determinable.

In summary, it is desirable to develop a random number generator which reliably produces random numbers at a high data rate. Additionally, the random number generator should accommodate integration with digital circuits on the same integrated circuit.

SUMMARY OF THE INVENTION

According to the invention, methods and an apparatus for generating random numbers are disclosed. In a first embodiment, a method for generating random numbers involves producing a second random number. A pseudorandom number is produced from a digital random number generator and a first random number is produced from an analog random number generator. The first random number is combined with the pseudorandom number to produce a second random number that is a result of both generators' outputs.

In another embodiment, a method generates a random number using a cryptographic function. A pseudorandom number is generated from an output of the cryptographic function and a first random number is generated from an analog random number generator. The pseudorandom number and the first random number are coupled to an input of the cryptographic function in order to generate a second random number from the output of the cryptographic function where the second random number is related to the pseudorandom number and first random number.

In yet another embodiment, a random number generator apparatus having an output, a digital random number generator and an analog random number generator. The digital random number generator produces a pseudorandom number. The analog random number generator generates a random number. The random number generator's output is coupled to both the digital and analog random number generators.

DESCRIPTION OF THE SPECIFIC EMBODIMENTS

While this invention is susceptible of embodiments in many different forms, there is shown in the drawings and will herein be described in detail, a number of embodiments of the invention with the understanding that the present disclosure is to be considered as an exemplification of the principles of the invention and is not intended to limit the broad aspects of the invention to the embodiment illustrated.

In the Figures, similar components and/or features have the same reference label. Various components of the same type are distinguished by following the reference label by a dash and a second label that distinguishes among the similar components in the same figure. If only the first reference label is used in the following disclosure, the description is applicable to any one of the several similar components.

Figure 1:
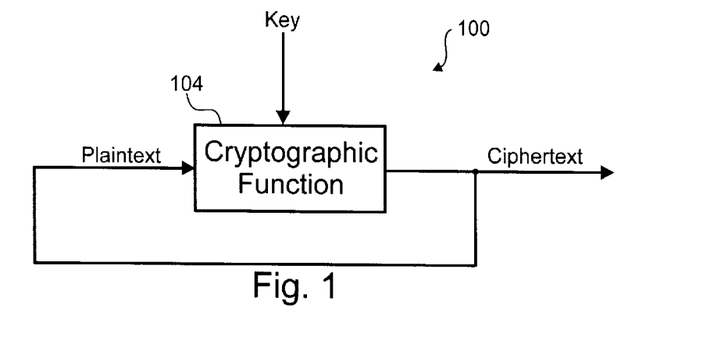
FIG. 1 is a block diagram representation of an embodiment of a random number generator which uses a cryptographic function.

One embodiment is illustrated in FIG. 1. This embodiment 100 produces blocks of pseudorandom numbers using a cryptographic function 104 or cryptofunction to encrypt in a loop. Included in the cryptofunction 104 is a plaintext input, a key input and a ciphertext output. The ciphertext output is used as the pseudorandom number.

The key input receives a key which is used by the cryptofunction 104 to produce the ciphertext output. The key is initialized into the device once, and need not change during the lifetime of the random number generator 100.

The ciphertext output produces blocks of pseudorandom numbers one after another. Each block is fed back into the input of the cryptofunction 104 as the seed for the next encryption. The cryptofunction 104 can be any symmetric or asymmetric crypto algorithm. For example, the asymmetric crypto algorithm could be an asymmetric public key cipher. Additionally, the cryptofunction 104 could either encrypt or decrypt to produce the pseudo random numbers. Preferably, the crypto algorithm is a symmetric block cipher function which encrypts to produce the random numbers. An example of the symmetric block cipher function is the Data Encryption Standard (DES).

To increase the random state of the cryptofunction 104, a random number seed is used. The seed is preferably produced with a high grade analog random number generator. Having a random seed makes the values in the output orbit unpredictable. However, this embodiment will repeat the same distinct set of values in the orbit until the key is changed. The output appears random because for strong cryptofunctions 104 the orbit is very large.

To further increase the quality of the pseudorandom output, the speed of the cryptofunction 104 is accelerated beyond the speed at which the output is read. By running the cryptofunction 104 fast, two successive pseudorandom numbers read would be separated by pseudorandom numbers which could not be read. Hence, the output is decorrelated from the cryptofunction 104. As those skilled in the art can appreciate, this feature makes it more difficult for an attacker to determine the key or cryptographic algorithm by analyzing the output.

Figure 2:
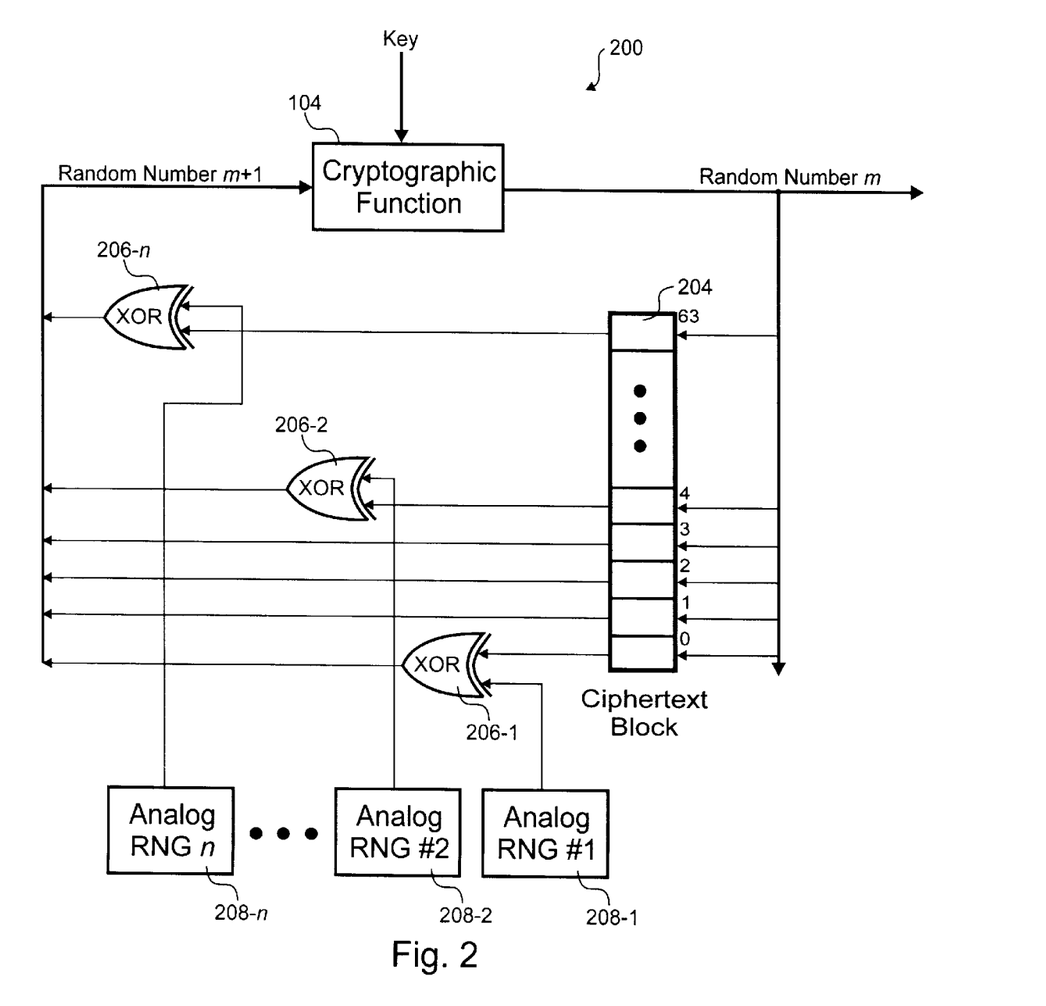
FIG. 2 is a block diagram illustrating an embodiment of a random number generator which uses both analog random number generators and a cryptofunction to produce random numbers.

With reference to FIG. 2, another embodiment of a random number generator 200 is shown in block diagram form. Included in the random number generator 200 is a cryptofunction 104, a ciphertext block register 204, a number of analog random number generators ("RNG") 208, and a number of exclusive OR (XOR) gates 206. This embodiment uses both a cryptofunction 104 and analog random number generators 208 to produce truly random numbers. Additionally, this embodiment is robust because failure of all the analog random number generators 208 will not ruin the random number generator 200. Failure of all analog random number generators would reduce the circuits effectiveness to that of the embodiment in FIG. 1.

The cryptofunction 104 produces a first random number (m) which is coupled to a ciphertext block register 204. The ciphertext register 204 can be a serial or parallel configured memory register which stores one sixty-four bit block of ciphertext from the cryptofunction 104. A delay of one random number generation time cycle is introduced by the ciphertext register 204.

When the random number (m) is leaves the register 204, preferably at least one bit is acted upon by the analog random number generator 208. As can be appreciated by those skilled in the art, modification of one bit will change the orbit of the cryptofunction 104. Accordingly, if one bit is changed by an analog random number generator per orbit, a repeating orbit will never occur. Preferably, some bits leaving the ciphertext register 204 are XORed with the output from the analog number generators 208. However, other embodiments could combine the output from the register 204 and the analog random number generator 208 in any number of ways.

The analog random number generators 208 are preferably on the same integrated circuit as the cryptofunction 104. However, they could equally be on another integrated circuit. The analog random number generators 208 variously convert heat, electrical noise, diode electron junction noise, phase noise from a phase locked loop, and/or metastable timing boundaries into a random binary data stream. If these generators 208 are produced on chip (i.e., on the same integrated circuit), they may be unreliable for the reasons explained above in the background section. If all of the generators 208 fail, the cryptofunction will use the last random number as a seed to pseudorandomly generate pseudorandom numbers with the cryptofunction 104 alone.

Each analog random number generator 208 produces an output which may modify a bit output from the ciphertext register 204. The output from the random number generator could be XORed with a bit of the register 204 or simply replace that bit. If the analog random number generator 208 has stopped producing a random output, the effect of the generator 208 upon the register 204 is logically disabled to prevent reductions in randomness. One way to test the effectiveness of a generator 208 is to check for an even distribution of zeros and ones over time. Other techniques for testing the effectiveness of a generator 208 are also known. In other embodiments, the generator 208 could produce a number of bits for each ciphertext block and modify the same number of bits output from the register 204.

After the analog generators 208 introduce entropy into the random number (m), the result is a second random number (m+1). The second random number is coupled to the plaintext input of the cryptofunction 104 as a seed to produce a third random number (m+2). This cycle repeats to produce random number blocks in a cyclical fashion.

Figure 3:
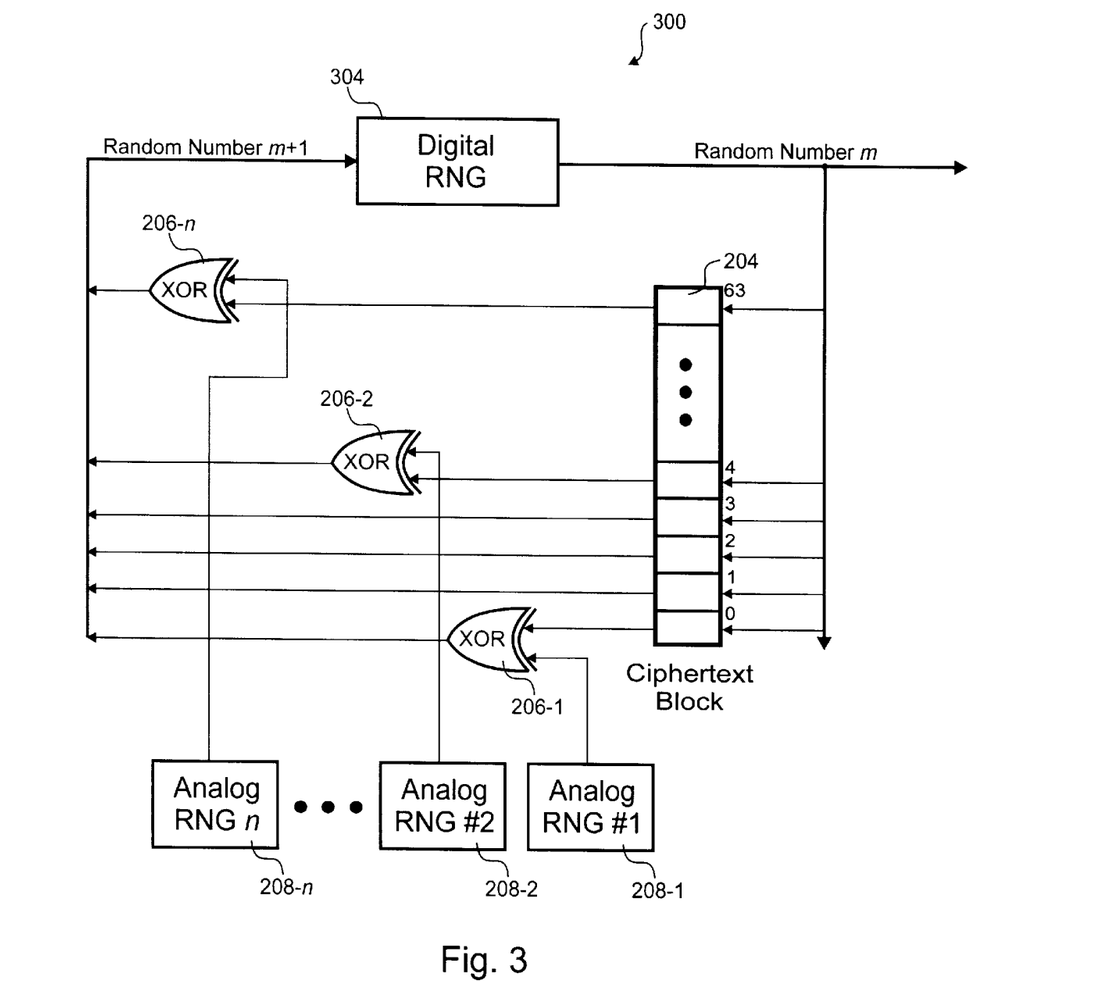
FIG. 3 is a block diagram representation of another embodiment of a random number generator which uses both analog and digital random number generation techniques.

Referring next to FIG. 3, another embodiment of a random number generator 300 is illustrated in block diagram form. This embodiment is similar to the embodiment of FIG. 2, except the cryptofunction 104 is replaced with a digital random number generator 304. Preferably, a software algorithm serves as the digital random number generator 304, but other embodiments could use a hardware circuit. The resulting pseudorandom number from the generator 304 is deterministic. As discussed in the background section, software random number generators have short orbits. However, since analog randomness is introduced by the analog random number generators 208, this embodiment produces robust random numbers without a repeating orbit.

The digital random number generator 304 could be implemented in any number of ways. Preferably, a linear congruential algorithm is encoded in software and executed on a general purpose processor. However, this invention can increase the robustness of any digital random number generating technique.

Figure 4:
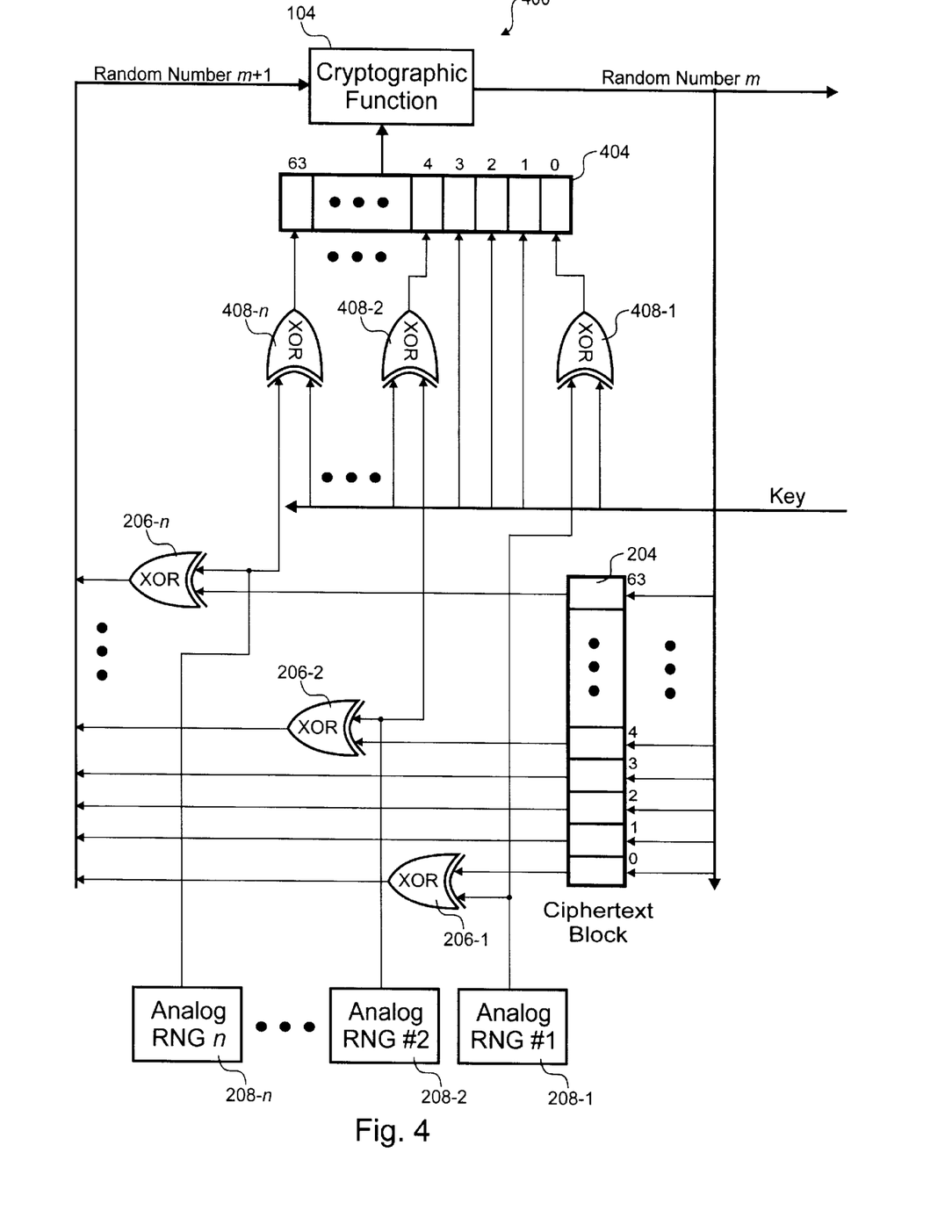
FIG. 4 is a block diagram illustrating an embodiment of a random number generator which uses analog random number generation techniques to additionally randomize the key.

With reference to FIG. 4, an embodiment of a random number generator 400 is shown in block diagram form. This generator 400 improves randomness by changing the key used in the cryptofunction 104 in addition to changing the bits output from the ciphertext block register 204. A digital random number generator which used a cryptofunction (for example, see FIG. 1) repeats an orbit so long as the key remains unchanged. However, changing the key will change the relationship between the plaintext and ciphertext which also changes the orbit.

The key is stored in a key register 404 before loading into the cryptofunction 104. The analog random number generators 208 randomize bits input into the key register 404 by XORing 408 those bits with respective analog random number generators 208. Periodically, the randomized key is loaded into the cryptofunction 104. As can be appreciated, the actual value of the key is typically not important for the purposes of generating random numbers.

Figure 5:
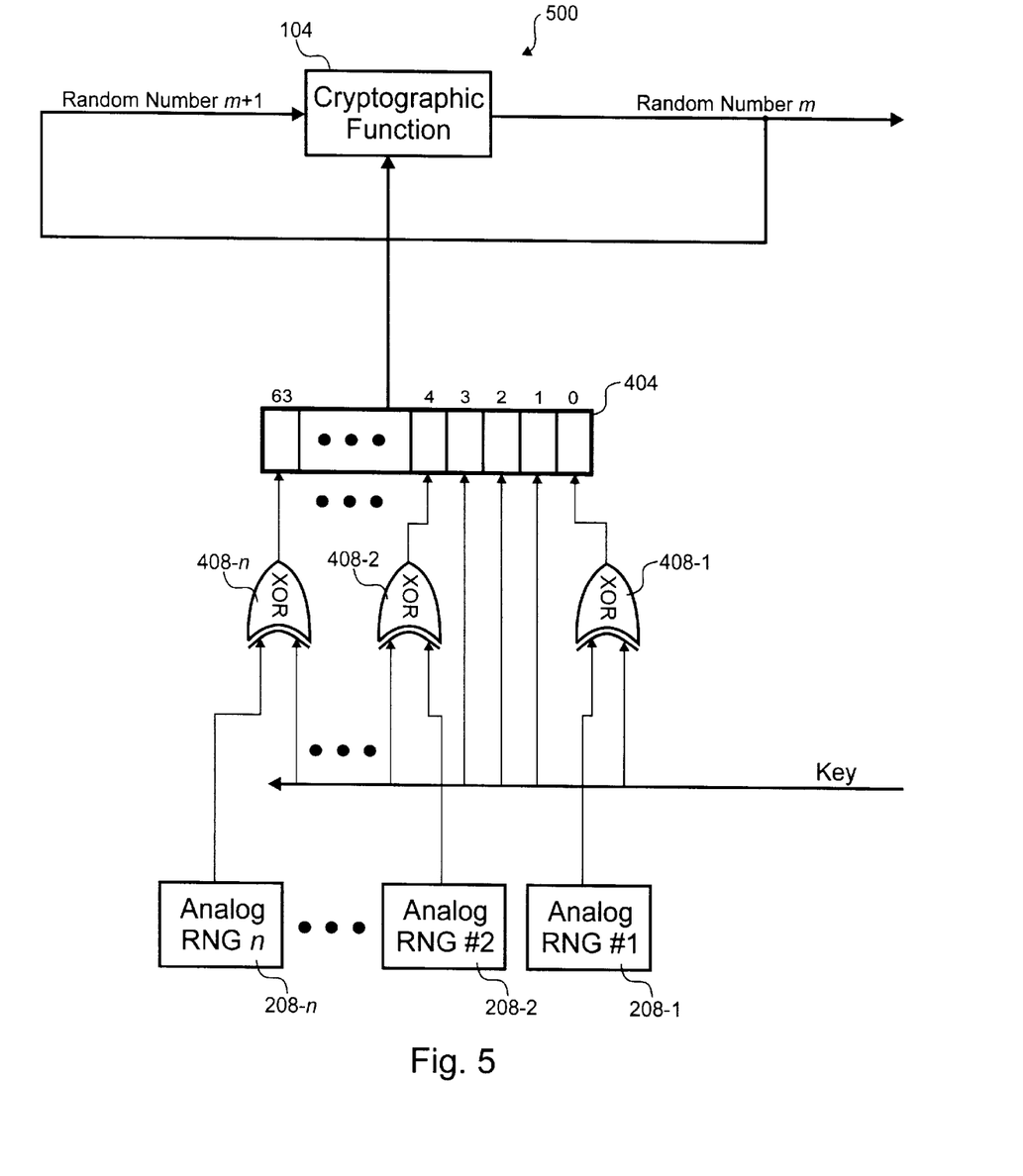
FIG. 5 is a block diagram illustrating an embodiment of a random number generator which uses analog random number generation techniques to randomize the key.

Referring next to FIG. 5, an embodiment of a random number generator 500 is shown which randomizes a key input into the cryptofunction 104. This embodiment is similar to the embodiment of FIG. 4 except analog random number generators 208 are not coupled to the encryption loop. The key input is randomized by coupling a number of analog random number generators to bits of the key through XOR gates. Periodically, the newly randomized key in the key register 404 is loaded into the cryptofunction 104. As can be appreciated by those skilled in the art, changing the key alters the repeating pattern of random numbers in the orbit produced by the cryptofunction 104.

Figure 6:
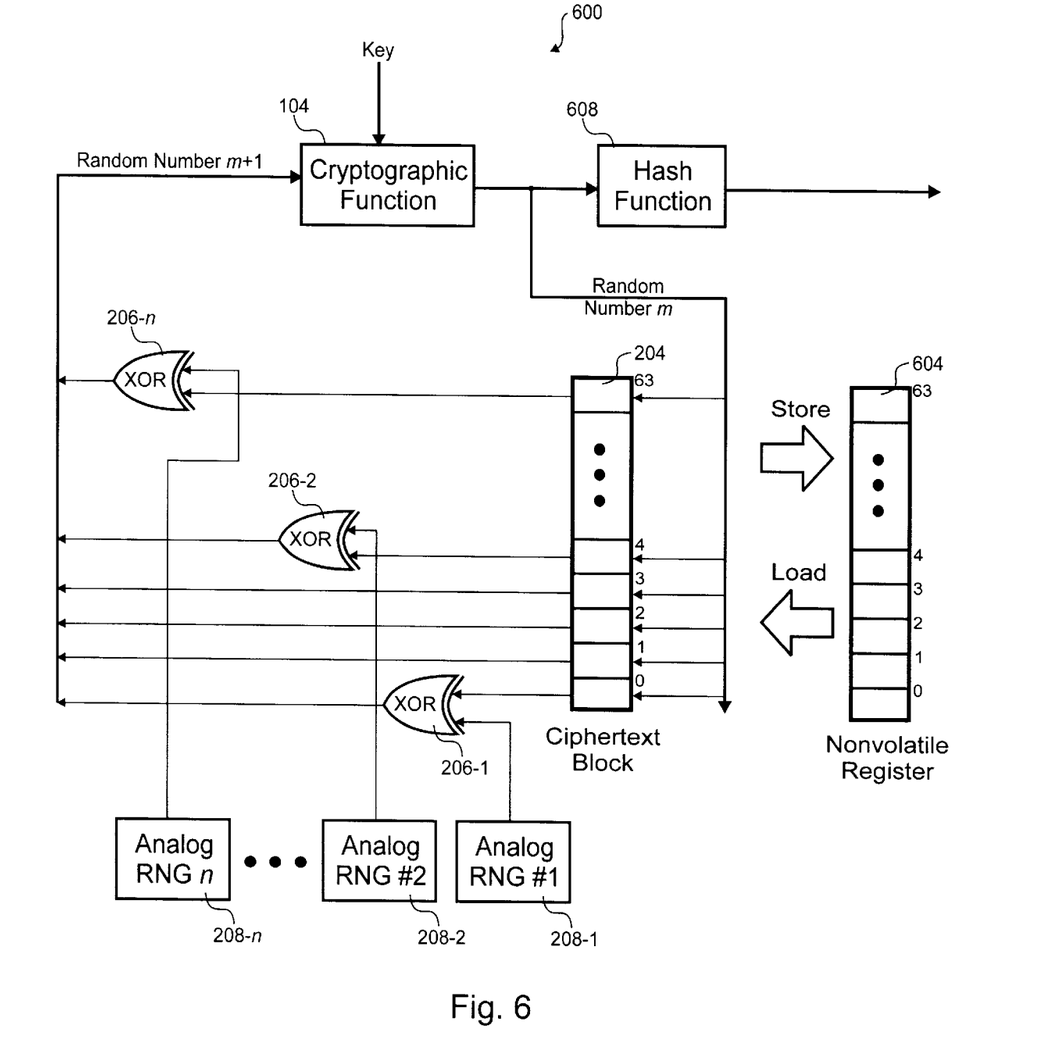
FIG. 6 is a block diagram representation of an embodiment of a random number generator which utilizes a hash function and a nonvolatile register.

With reference to FIG. 6, another embodiment of a random number generator 600 is illustrated as a block diagram. This generator 600 adds a non-volatile register 604 and a hash function 608 to further improve the random number quality.

The hash function 608 takes the output from the cryptofunction 104 and further scrambles the output. Preferably, a secure hash algorithm, such as SHA-1, is used. Those skilled in the art can appreciate that adding the hash function increases the security of the cryptographic algorithm and key from attackers by introducing a barrier to analysis in the form of the hash function's inherent one-way function.

To preserve the randomness in the orbit, a nonvolatile register 604 is used to periodically store a cipher text block. Preferably, the register 604 is battery backed random access memory (RAM), but could also be flash memory, magnetic core memory, electrically erasable read only memory, or other nonvolatile memory. Periodically, a processor (not shown) reads the cipher text block register 204 and stores that value in the nonvolatile register 604. When power is removed from the circuit, the nonvolatile register 604 retains the last stored random number. Upon application of power, the processor reads the nonvolatile register 604 and loads that value into the ciphertext register 204. The recovered value is used as a seed for subsequent random number generation. Accordingly, any accumulation of randomness over time is substantially retained.

Figure 7:
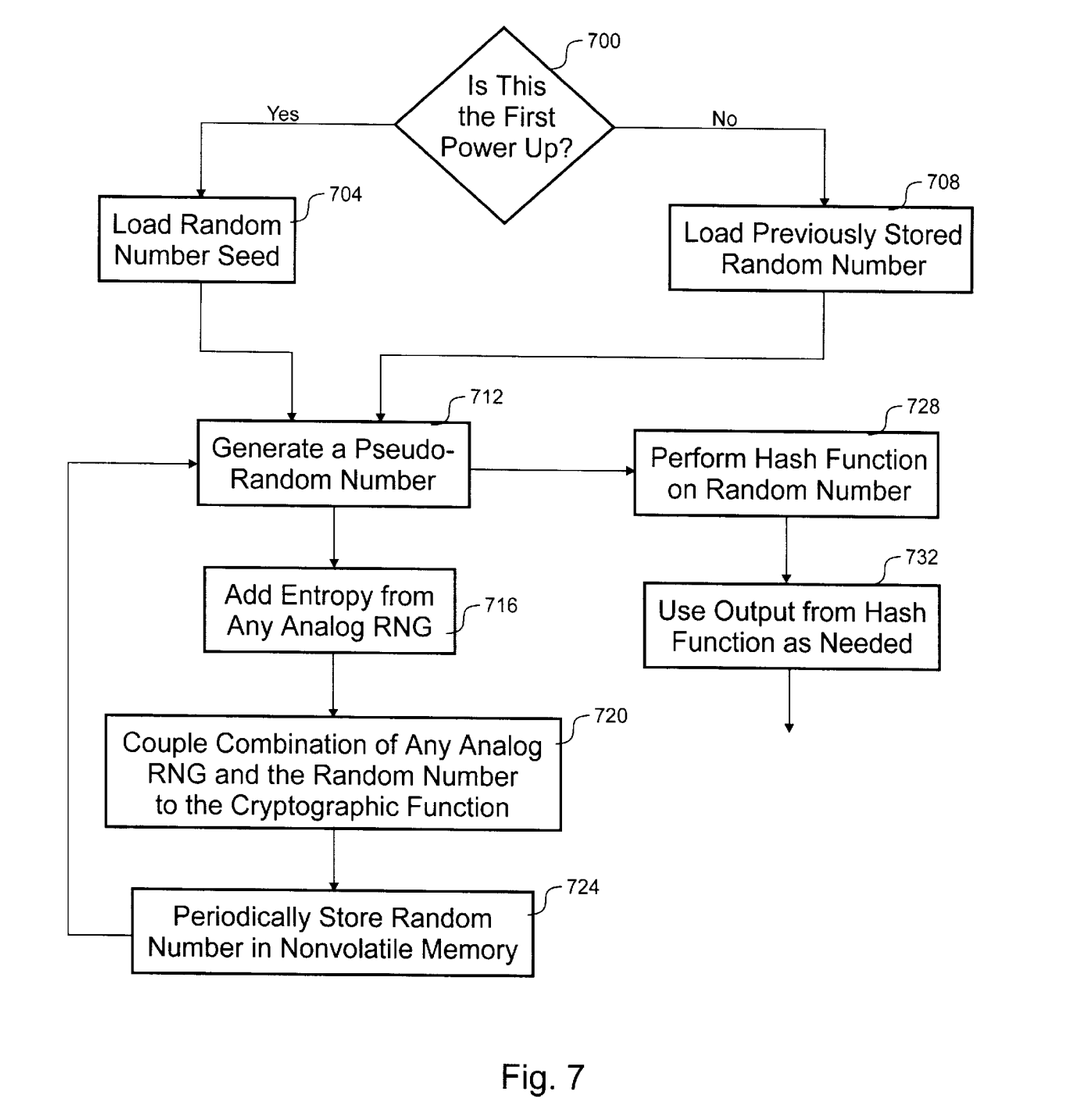
FIG. 7 is a flow diagram illustrating a method for generating a random number.

With reference to FIG. 7, a flow diagram is shown which depicts one method for producing a random number. In step 700, a determination is made whether this is the first power up of the random number generator. This could be determined by checking for a previously stored software variable or checking for a value in the nonvolatile register 604. If it is determined this is the first power up, a random number seed is loaded in step 704. Preferably, the seed number is generated external to the integrated circuit by a high quality analog random number generator. In the case where the random number was previously stored because this is not the first application of power, the nonvolatile register 604 is loaded in step 708.

Once the random number generator is initialized with a random seed, the generation of additional random numbers can proceed. In step 712, a random number is generated from the random seed. In step 728, a hash function is performed upon the random number. If any circuit or cryptographic operation requires a random number, it is used in step 732.

After a random number is generated in step 712, the next random number in the orbit is prepared. In step 716, the analog random number generators 208 mixes additional randomness into the random number. In step 720, the output is coupled to the plaintext input of the cryptofunction 104. Periodically, step 724 stores the present random number in nonvolatile register 604. A processor stores the present random number at infrequent intervals, such as once per second. In this way, the generator produces random numbers in a robust manner.

In light of the above description, a number of advantages of the present invention are readily apparent. The random number generator can produce pseudorandom numbers even if all analog random number generators fail. By not relying solely upon analog random number generation, integration of analog random number generators is practical in a digital semiconductor process even though the analog generators may have poor initial characteristics and eventually fail. Additionally, high random number data rates are possible since the random number generator utilizes digital techniques.

A number of variations and modifications of the invention can also be used. In different embodiments, the random number generator can be modified in any one or more of the following ways. The cryptofunction could serve a dual role in providing both random numbers and encryption/decryption. Accordingly, the circuit which already has a cryptofunction would require little additional circuitry to also provide random number generation. Although the above embodiment discussed in relation to FIG. 6 periodically stores the random number for later use as a seed, other embodiments could store the random number after power is removed if adequate operating power is supplied internally by capacitors or a battery.

The foregoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claims be construed to include alternative embodiments to the extent permitted by the prior art.

What is claimed is:

1. A method for generating random numbers, the method comprising steps of:

producing a pseudorandom number with a cryptographic function;

producing a first random number from an analog random number generator;

combining the first random number with the pseudorandom number to produce a second random number that is a result of both generators' outputs; and producing a third random number from the second random number by using the cryptogaphic function.

2. The method according to claim 1, further comprising steps of:

periodically storing the second random number in a non-volatile memory location;

powering up the digital random number generator; and loading the previously stored second random number into the cryptographic function.

3. The method according to claim 1, wherein the step of producing a pseudorandom number comprises executing a software algorithm on a processor.

4. The method according to claim 1, wherein the step of producing a pseudorandom number comprises producing a pseudorandom number block from a symmetric block cipher function.

5. The method according to claim 1, wherein the step of producing a pseudorandom number comprises producing a pseudorandom number from an asymmetric public key cipher function.

6. A method for generating a random number with a cryptographic function, the method comprising the steps of:

generating a pseudorandom number from an output of the cryptographic function;

generating a first random number from an analog random number generator;

forming a second random number from the pseudorandom number and the first random number;

coupling the second random number to an input of the cryptographic function; and generating a third random number from the output of the cryptographic function which is related to the second random number.

7. The method according to claim 6, wherein the cryptographic function and the analog random number generator are located in a same package.

8. The method according to claim 7, further comprising a step of storing the third random number in a non-volatile memory location.

9. The method according to claim 6, wherein the step of generating a pseudorandom number comprises a step of initializing the cryptographic function with a random number source.

10. The method according to claim 9, wherein the random number source is external to a package which comprises the cryptographic function and the analog random number generator.

11. The method according to claim 6, further comprising a step of loading a key into the cryptographic function.

12. The method according to claim 11, further comprising a step of coupling the analog random number generator to a bit of the key before the step of loading a key.

13. A random number generator apparatus, comprising:

an output that produces a digital random number comprising a plurality of bits;

a cryptographic function coupled to the output, wherein the cryptographic function generates the digital random number;

an input coupled to the cryptographic function, wherein the output is, at least partially, coupled to the input; and an analog random number generator which generates a random analog signal, wherein the random analog signal is coupled to the input.

14. The random number generator apparatus of claim 13, wherein the output is sampled at a first rate slower than a second rate at which digital random numbers are produced.

15. The random number generator apparatus of claim 13, further comprising a register having a plurality of bits which comprises the digital random number, wherein the analog random number generator is coupled to at least one of the plurality of bits.

16. The random number generator apparatus of claim 13, further comprising a plurality of analog random number generators.

17. The random number generator apparatus of claim 13, further comprising a hash function coupled to the output.

18. A random number generator that produces a random digital word, the generator comprising:

an output that produces the random digital word having a plurality of bits;

a cryptographic function coupled to the output, wherein the cryptographic function generates the random digital word;

an analog random number generator that generates a random analog signal; and an input word coupled to the cryptographic function, wherein the random digital word and the analog random signal are coupled to the input.

19. The random number generator as recited in claim 18, wherein the output is configured to transport the random digital signal as a parallel word.

20. The random number generator as recited in claim 18, wherein the cryptographic function encrypts the input to produce the output.

21. The random number generator as recited in claim 18, wherein the random digital word is fed-back into the cryptographic function to affect generation of a next random digital word.

* * * * *

UNITED STATES PATENT AND TRADEMARK OFFICE
CERTIFICATE OF CORRECTION

PATENT NO. : 6,253,223 B1
DATED : June 26, 2001
INVENTOR(S) : Eric J. Sprunk

It is certified that error appears in the above-identified patent and that said Letters Patent is hereby corrected as shown below:

<u>Column 7,</u>
Line 28, please delete "generators' outputs" and insert --the cryptographic function and the analog random number generator" therefor.

Signed and Sealed this

Ninth Day of July, 2002

*Attest:*

JAMES E. ROGAN
*Attesting Officer*    *Director of the United States Patent and Trademark Office*